United States Patent
Mizutani et al.

(10) Patent No.: US 11,802,614 B2
(45) Date of Patent: Oct. 31, 2023

(54) VEHICLE DRIVE DEVICE

(71) Applicants: AISIN CORPORATION, Aichi (JP); MITSUBISHI JIDOSHA KOGYO KABUSHIKI KAISHA, Tokyo (JP)

(72) Inventors: Toshihisa Mizutani, Kariya (JP); Kenta Kataoka, Kariya (JP); Taiki Owari, Kariya (JP); Hiroaki Osanai, Kariya (JP); Daiki Suyama, Kariya (JP); Hiroshi Kato, Kariya (JP); Yuki Yanagihara, Kariya (JP); Naoki Takahashi, Anjo (JP); Kiminobu Terao, Nagoya (JP); Takuya Ogasawara, Toyokawa (JP); Yosuke Morimoto, Anjo (JP)

(73) Assignees: AISIN CORPORATION, Aichi (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/636,120

(22) PCT Filed: Aug. 28, 2020

(86) PCT No.: PCT/JP2020/032607
§ 371 (c)(1),
(2) Date: Feb. 17, 2022

(87) PCT Pub. No.: WO2021/039966
PCT Pub. Date: Mar. 4, 2021

(65) Prior Publication Data
US 2022/0290749 A1    Sep. 15, 2022

(30) Foreign Application Priority Data
Aug. 29, 2019   (JP) ................... 2019-157276

(51) Int. Cl.
*F16H 48/36* (2012.01)
*F16H 48/11* (2012.01)

(52) U.S. Cl.
CPC .............. *F16H 48/36* (2013.01); *F16H 48/11* (2013.01); *F16H 2048/368* (2013.01)

(58) Field of Classification Search
CPC .......... F16H 48/36; F16H 37/06; B60K 1/02; B60K 17/046
See application file for complete search history.

(56) References Cited

U.S. PATENT DOCUMENTS

| 8,678,118 B2 * | 3/2014 | Takenaka ................. B60K 6/52 |
| | | 180/65.6 |
| 10,207,572 B2 * | 2/2019 | Makino ................ B60K 7/0007 |
| 2011/0281684 A1 | 11/2011 | Ushiroda et al. |

FOREIGN PATENT DOCUMENTS

| EP | 3 936 371 A1 | 1/2022 |
| JP | 2011237019 A | 11/2011 |
| | (Continued) | |

OTHER PUBLICATIONS

The extended European Search Report dated Jul. 25, 2022, by the European Patent Office in corresponding European Patent Application No. 20856477.3-1012. (17 pages).

(Continued)

*Primary Examiner* — Derek D Knight
(74) *Attorney, Agent, or Firm* — BUCHANAN INGERSOLL & ROONEY PC (57) ABSTRACT

A vehicle drive device is provided that can suppress the increase in dimension in the radial direction while ensuring a sufficient speed reduction ratio. Two driving force sources are arranged on a first axis, two output members are arranged on a second axis, two counter gear mechanisms are arranged on a third axis. A planetary gear mechanism is configured to transmit rotation from the two counter gear (Continued)

mechanisms to the output members, and is disposed so as to overlap with both of the two counter gear mechanisms as seen in an axial direction along and axial direction.

10 Claims, 5 Drawing Sheets

(56) References Cited

FOREIGN PATENT DOCUMENTS

| JP | 2018084315 A | * | 5/2018 |
|----|--------------|---|--------|
| JP | 2018084315 A |   | 5/2018 |
| JP | 2018155310 A |   | 10/2018 |

OTHER PUBLICATIONS

International Search Report (PCT/ISA/210) with translation and Written Opinion (PCT/ISA/237) dated Oct. 20, 2020, by the Japan Patent Office as the International Searching Authority for International Application No. PCT/JP2020/032607. (9 pages).

* cited by examiner

VEHICLE DRIVE DEVICE

TECHNICAL FIELD

The present disclosure relates to a vehicle drive device including a first driving force source, a second driving force source, a first output member drivingly connected to a first wheel, and a second output member drivingly connected to a second wheel.

BACKGROUND ART

An example of such a vehicle drive device is disclosed in Patent Document 1 below. Hereinafter, in the description of the background art, reference numerals in Patent Document 1 are used in parentheses.

A vehicle drive device (1) of Patent Document 1 includes: a first driving force source (2L); a second driving force source (2R); a first output member (65c) drivingly connected to a first wheel (61L); a second output member (65c) drivingly connected to a second wheel (61R); a planetary gear mechanism (30A, 30B); and an idler gear. The first driving force source (2L) and the second driving force source (2R) are arranged such that rotation axes thereof are coaxially arranged, the first output member (65c), the first output member (65c), and the planetary gear mechanism (30A, 30B) are arranged such that rotation axes thereof coincide with an axis that is parallel with and different from the rotation axes of the driving force sources (2L, 2R), and the idler gear is disposed such that a rotation axis thereof coincides with an axis that is parallel with and different from these.

RELATED ART DOCUMENTS

Patent Documents

Patent Document 1: Japanese Unexamined Patent Application Publication No. 2018-155310 (JP 2018-155310 A) (FIG. 10)

SUMMARY

In the vehicle drive device of Patent Document 1, the driving force sources (2L, 2R) and the planetary gear mechanism (30A, 30B) are drivingly connected with the idler gear, but there is a case where a sufficient speed reduction ratio cannot be obtained with the idler gear. In order to increase the speed reduction ratio, it is conceivable to provide a counter gear mechanism instead of the idler gear. However, in general, when the counter gear mechanism is used, the size of the vehicle drive device tends to increase in the radial direction.

Thus, it is desired to realize a vehicle drive device that can suppress the increase in dimension in the radial direction while ensuring a sufficient speed reduction ratio.

As the characteristic configuration of a vehicle drive device in view of the above, a vehicle drive device includes: a first driving force source; a second driving force source; a first output member drivingly connected to a first wheel; and a second output member drivingly connected to a second wheel; and a power transmission device, wherein: the first driving force source and the second driving force source are arranged on a first axis; the first output member and the second output member are arranged on a second axis that is different from the first axis; the power transmission device includes a first gear that rotates integrally with a rotating body of the first driving force source, a second gear that rotates integrally with a rotating body of the second driving force source, a first counter gear mechanism and a second counter gear mechanism arranged on a third axis that is different from the first axis and the second axis, and a planetary gear mechanism disposed on the second axis; the first counter gear mechanism includes a third gear that meshes with the first gear, and a fourth gear that rotates integrally with the third gear; the second counter gear mechanism includes a fifth gear that meshes with the second gear, and a sixth gear that rotates integrally with the fifth gear; and the planetary gear mechanism is configured to transmit rotation of the fourth gear and the sixth gear to the first output member and the second output member and is disposed so as to overlap with both the first counter gear mechanism and the second counter gear mechanism as seen in an axial direction along an axial direction.

In this characteristic configuration, rotation of the first driving force source is input to the planetary gear mechanism via the first counter gear mechanism. The rotation of the second driving force source is input to the planetary gear mechanism via the second counter gear mechanism. This facilitates changing the speed of the rotation input to the planetary gear mechanism such that the rotation speeds of the rotation elements of the planetary gear mechanism become appropriate rotation speeds. Thus, the load on the planetary gear mechanism can be kept small. In this configuration, the first driving force source and the second driving force source are arranged on the first axis. The first output member, the second output member, and the planetary gear mechanism are arranged on the second axis. Further, the first counter gear mechanism and the second counter gear mechanism are arranged on the third axis. That is, the components of the vehicle drive device are separately arranged on the three axes. This makes it possible to suppress the increase in dimension of the vehicle drive device in the axial direction, as compared with the configuration in which the components of the vehicle drive device are arranged coaxially. With this configuration, a torque difference between the first output member and the second output member can be appropriately controlled by one planetary gear mechanism. Thus, the vehicle drive device can have a simple configuration. As a result, the manufacturing cost of the vehicle drive device can be reduced. In this configuration, the planetary gear mechanism is disposed using a space overlapping with both the first counter gear mechanism and the second counter gear mechanism as seen in the axial direction. Thus, it is possible to suppress the increase in dimension of the vehicle drive device in the radial direction due to the placement of the planetary gear mechanism. Thus, with this configuration, it is possible to realize a vehicle drive device capable of suppressing the increase in radial dimension while ensuring a sufficient speed reduction ratio.

DETAILED DESCRIPTION

Figure 1:
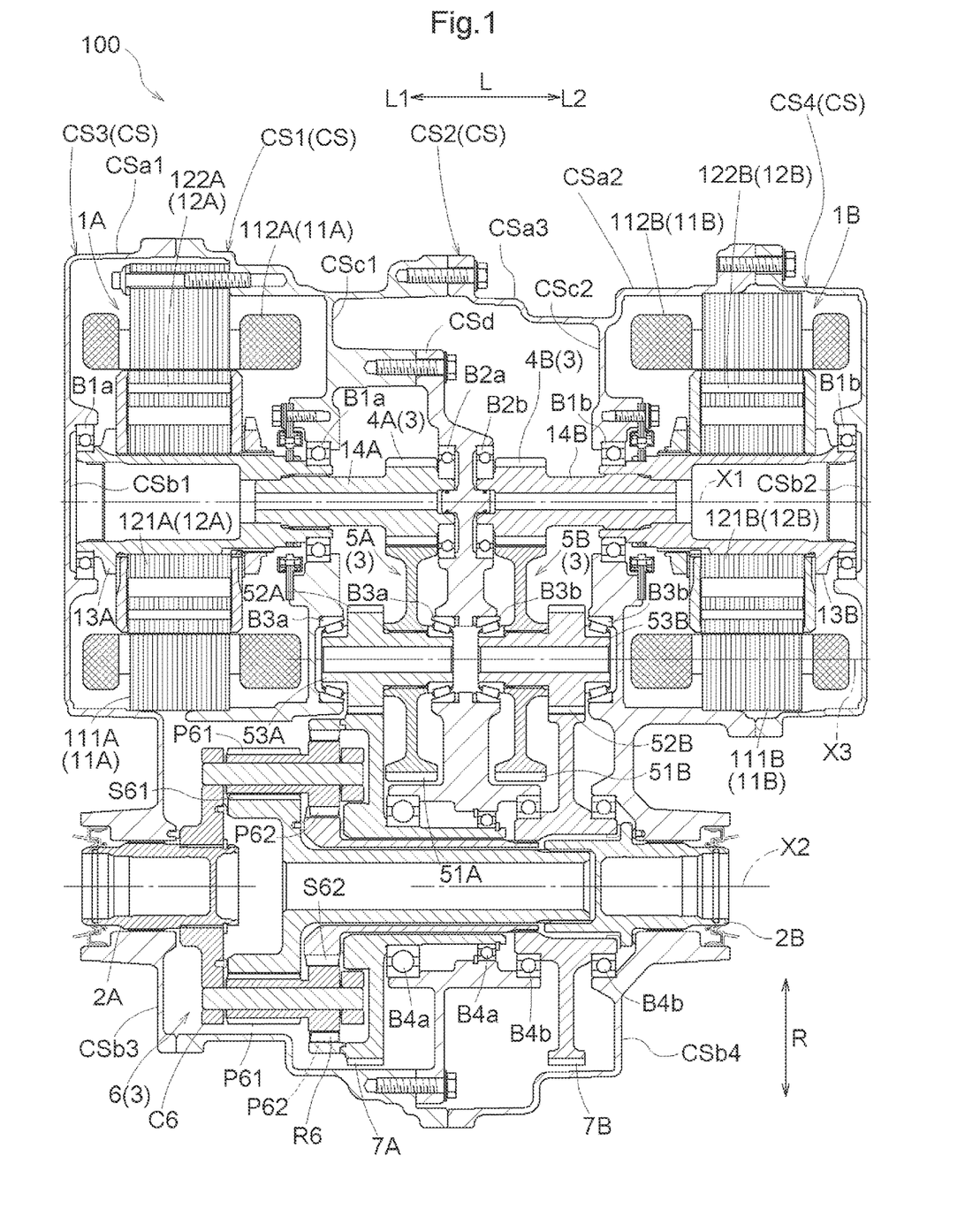
FIG. 1 is a sectional view taken along an axial direction of a vehicle drive device according to an embodiment.
Figure 2:
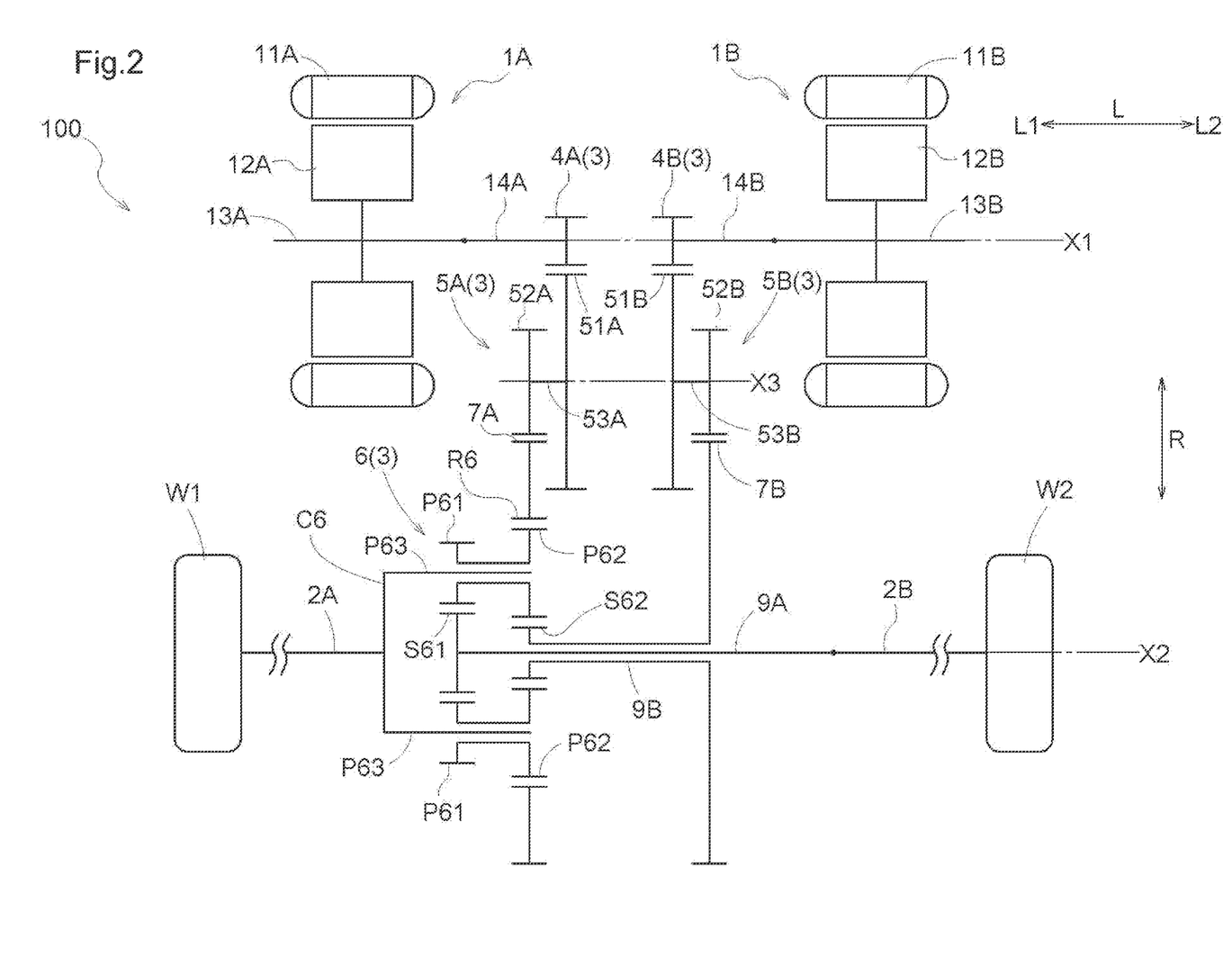
FIG. 2 is a skeleton diagram of the vehicle drive device according to the embodiment.

Hereinafter, a vehicle drive device 100 according to an embodiment will be described with reference to the drawings. As shown in FIGS. 1 and 2, the vehicle drive device 100 includes: a first rotary electric machine 1A; a second rotary electric machine 1B; a first output member 2A drivingly connected to a first wheel W1; a second output member 2B drivingly connected to a second wheel W2; and a power transmission device 3. In the present embodiment, these are accommodated in a case CS. Part of the first output member 2A and the second output member 2B is exposed to the outside of the case CS.

In the present application, "drivingly connected" refers to a state in which two rotation elements are connected so that a driving force can be transmitted, and includes a state in which the two rotation elements are connected so as to rotate integrally or a state in which the two rotation elements are connected so as to be able to transmit a driving force via one or two or more transmitting members. Such transmitting members include various members that transmit rotation at the same speed or at a changed speed, such as a shaft, a gear mechanism, a belt, and a chain, for example. The transmitting members may include an engagement device that selectively transmits rotation and driving force, such as a friction engagement device, an intermeshing engagement device, and the like.

The first rotary electric machine 1A and the second rotary electric machine 1B are arranged on a first axis X1. Specifically, each of a rotating body of the first rotary electric machine 1A and a rotating body of the second rotary electric machine 1B rotates about the first axis X1. The first output member 2A and the second output member 2B are arranged on a second axis X2 different from the first axis X1. Specifically, each of the first output member 2A and the second output member 2B rotates about the second axis X2.

The power transmission device 3 includes: a first input gear 4A that rotates integrally with the rotating body of the first rotary electric machine 1A; a second input gear 4B that rotates integrally with the rotating body of the second rotary electric machine 1B; a first counter gear mechanism 5A and a second counter gear mechanism 5B arranged on a third axis X3 different from the first axis X1 and the second axis X2; and a planetary gear mechanism 6 disposed on the second axis X2. In the present embodiment, the first input gear 4A and the second input gear 4B are arranged on the first axis X1.

The first axis X1, the second axis X2, and the third axis X3 are virtual axes that are different from each other and are arranged in parallel with each other.

In the following description, the direction parallel to the axes X1 to X3 will be referred to as an "axial direction L" of the vehicle drive device 100. In the axial direction L, the side on which the first rotary electric machine 1A is disposed, with respect to the second rotary electric machine 1B, will be referred to as a "first side L1 in the axial direction", and the opposite side will be referred to as a "second side L2 in the axial direction". The direction orthogonal to each of the above axes X1 to X3 will be referred to as a "radial direction R" with respect to each axis. When it is not necessary to distinguish the axis to be used as a reference, or when the axis to be used as a reference is clear, the direction may be simply referred to as the "radial direction R".

The first rotary electric machine 1A corresponds to a "first driving force source". The first rotary electric machine 1A has a function as a motor (electric motor) that receives supply of electric power to generate driving force, and a function as a generator (electric power generator) that receives supply of driving force to generate electric power.

The first rotary electric machine 1A includes a first stator 11A and a first rotor 12A. The first stator 11A has a first stator core 111A fixed to a non-rotating member (here, the case CS). The first rotor 12A corresponds to the "rotating body" of the first rotary electric machine 1A. The first rotor 12A has a first rotor core 121A that is rotatable with respect to the first stator 11A. A first rotor shaft 13A extending along the axial direction L is connected to the first rotor core 121A so as to rotate integrally with the first rotor core 121A.

In the present embodiment, the first rotary electric machine 1A is an inner rotor type rotary electric machine. Therefore, the first rotor core 121A is disposed inside the first stator core 111A in the radial direction R. The first rotor shaft 13A is disposed inside the first rotor core 121A in the radial direction R. In the present embodiment, the first rotary electric machine 1A is a revolving field-type rotary electric machine. Therefore, a first stator coil 112A is wound around the first stator core 111A such that coil end portions are provided that protrude from the first stator core 111A to the opposite sides in the axial direction L (the first side L1 in the axial direction and the second side L2 in the axial direction). The first rotor core 121A is provided with first permanent magnets 122A.

The second rotary electric machine 1B corresponds to a "second driving force source". The second rotary electric machine 1B has a function as a motor (electric motor) that receives supply of electric power to generate driving force, and a function as a generator (electric power generator) that receives supply of driving force to generate electric power.

The second rotary electric machine 1B includes a second stator 11B and a second rotor 12B. The second stator 11B has a second stator core 111B fixed to a non-rotating member (here, the case CS). The second rotor 12B corresponds to the "rotating body" of the second rotary electric machine 1B. The second rotor 12B has a second rotor core 121B that is rotatable with respect to the second stator 11B. A second rotor shaft 13B extending along the axial direction L is connected to the second rotor core 121B so as to rotate integrally with the second rotor core 121B.

In the present embodiment, the second rotary electric machine 1B is an inner rotor type rotary electric machine. Therefore, the second rotor core 121B is disposed inside the second stator core 111B in the radial direction R. The second rotor shaft 13B is disposed inside the second rotor core 121B in the radial direction R. In the present embodiment, the second rotary electric machine 1B is a revolving field-type rotary electric machine. Therefore, a second stator coil 112B is wound around the second stator core 111B such that coil end portions are provided that protrude from the second stator core 111B to the opposite sides in the axial direction L (the first side L1 in the axial direction and the second side L2 in the axial direction). The second rotor core 121B is provided with second permanent magnets 122B.

The second rotary electric machine 1B is provided so as to be rotatable independently of the first rotary electric machine 1A. That is, the second rotor 12B is not connected so as to rotate integrally with the first rotor 12A, and the ratio of the rotation speed of the first rotor 12A and the rotation speed of the second rotor 12B changes in accordance with the state of the vehicle drive device 100. In the present embodiment, as the first rotary electric machine 1A and the second rotary electric machine 1B, two rotary electric machines having the same output characteristics are used. It should be noted that for the first rotary electric machine 1A and the second rotary electric machine 1B, rotary electric machines having different output characteristics may be used.

In the present embodiment, a first input shaft 14A extending along the axial direction L is connected to the first rotor shaft 13A so as to rotate integrally with the first rotor shaft 13A. A first input gear 4A is connected to the first input shaft 14A so as to rotate integrally with the first input shaft 14A. Thus, the first input gear 4A rotates integrally with the first rotor 12A of the first rotary electric machine 1A. That is, the first input gear 4A corresponds to a "first gear" that rotates integrally with the rotating body of the first driving force source. In the example shown in FIG. 1, the first input shaft 14A and the tubular first rotor shaft 13A are connected with each other by spline engagement with the first input shaft 14A disposed inside the first rotor shaft 13A in the radial direction R. The first input gear 4A is provided on the outer peripheral surface of the first input shaft 14A at a portion that is more toward the second side L2 in the axial direction than the center in the axial direction L.

In the present embodiment, a second input shaft 14B extending along the axial direction L is connected to the second rotor shaft 13B so as to rotate integrally with the second rotor shaft 13B. A second input gear 4B is connected to the second input shaft 14B so as to rotate integrally with the second input shaft 14B. Thus, the second input gear 4B rotates integrally with the second rotor 12B of the second rotary electric machine 1B. That is, the second input gear 4B corresponds to a "second gear" that rotates integrally with the rotating body of the second driving force source. In the example shown in FIG. 1, the second input shaft 14B and the tubular second rotor shaft 13B are connected with each other by spline engagement with the second input shaft 14B disposed inside the second rotor shaft 13B in the radial direction R. The second input gear 4B is provided on the outer peripheral surface of the second input shaft 14B at a portion that is more toward the first side L1 in the axial direction than the center in the axial direction L.

The first counter gear mechanism 5A includes a first counter input gear 51A and a first counter output gear 52A.

The first counter input gear 51A is an input element of the first counter gear mechanism 5A. The first counter input gear 51A meshes with the first input gear 4A. That is, the first counter input gear 51A corresponds to a "third gear" that meshes with the first gear (first input gear 4A).

The first counter output gear 52A is an output element of the first counter gear mechanism 5A. The first counter output gear 52A is connected to the first counter input gear 51A so as to rotate integrally with the first counter input gear 51A. That is, the first counter output gear 52A corresponds to a "fourth gear" that rotates integrally with the third gear (first counter input gear 51A). In the present embodiment, the first counter output gear 52A is connected to the first counter input gear 51A via the first counter shaft 53A extending in the axial direction L. The first counter output gear 52A meshes with a first planetary input gear 7A that functions as a "seventh gear".

The second counter gear mechanism 5B includes a second counter input gear 51B and a second counter output gear 52B.

The second counter input gear 51B is an input element of the second counter gear mechanism 5B. The second counter input gear 51B meshes with the second input gear 4B. That is, the second counter input gear 51B corresponds to a "fifth gear" that meshes with the second gear (second input gear 4B).

The second counter output gear 52B is an output element of the second counter gear mechanism 5B. The second counter output gear 52B is connected to the second counter input gear 51B so as to rotate integrally with the second counter input gear 51B. That is, the second counter output gear 52B corresponds to a "sixth gear" that rotates integrally with the fifth gear (second counter input gear 51B). In the present embodiment, the second counter output gear 52B is connected to the second counter input gear 51B via the second counter shaft 53B extending in the axial direction L. The second counter output gear 52B meshes with a second planetary input gear 7B that functions as an "eighth gear".

In the present embodiment, the first counter input gear 51A has a larger diameter than the first counter output gear 52A, and the second counter input gear 51B has a larger diameter than the second counter output gear 52B. The first counter input gear 51A and the second counter input gear 51B are arranged between the first counter output gear 52A and the second counter output gear 52B in the axial direction L.

The first counter gear mechanism 5A changes the speed of rotation from the first input gear 4A. The rotation from the first input gear 4A that has been reduced in speed by the first counter gear mechanism 5A is input to the planetary gear mechanism 6 via the first planetary input gear 7A. In the present embodiment, the first counter gear mechanism 5A reduces the speed of rotation from the first input gear 4A and transmits the rotation to the first planetary input gear 7A. Specifically, in the present embodiment, the first counter input gear 51A has a larger diameter than the first input gear 4A, and the first counter output gear 52A has a smaller diameter than the first planetary input gear 7A. Therefore, the rotation from the first input gear 4A is reduced in speed in accordance with the ratio of the number of teeth between the first input gear 4A and the first counter input gear 51A, and further reduced in speed in accordance with the ratio of the number of teeth between the first counter output gear 52A and the first planetary input gear 7A (that is, reduced in speed in two stages), and then input to the planetary gear mechanism 6. In the present embodiment, each of the first input gear 4A, the first counter input gear 51A, the first counter output gear 52A, and the first planetary input gear 7A is a helical gear.

The second counter gear mechanism 5B changes the speed of rotation from the second input gear 4B. The rotation from the second input gear 4B that has been reduced in speed by the second counter gear mechanism 5B is input to the planetary gear mechanism 6 via the second planetary input gear 7B. In the present embodiment, the second counter gear mechanism 5B reduces the speed of rotation from the second input gear 4B and transmits the rotation to the second planetary input gear 7B. Specifically, in the present embodiment, the second counter input gear 51B has a larger diameter than the second input gear 4B, and the second counter output gear 52B has a smaller diameter than the second planetary input gear 7B. Therefore, the rotation from the second input gear 4B is reduced in speed in accordance with the ratio of the number of teeth between the second input gear 4B and the second counter input gear 51B, and further reduced in speed in accordance with the ratio of the number of teeth between the second counter output gear 52B and the second planetary input gear 7B (that is, reduced in speed in two stages), and then input to the planetary gear mechanism 6. In the present embodiment, each of the second input gear 4B, the second counter input gear 51B, the second counter output gear 52B, and the second planetary input gear 7B is a helical gear.

Figure 3:
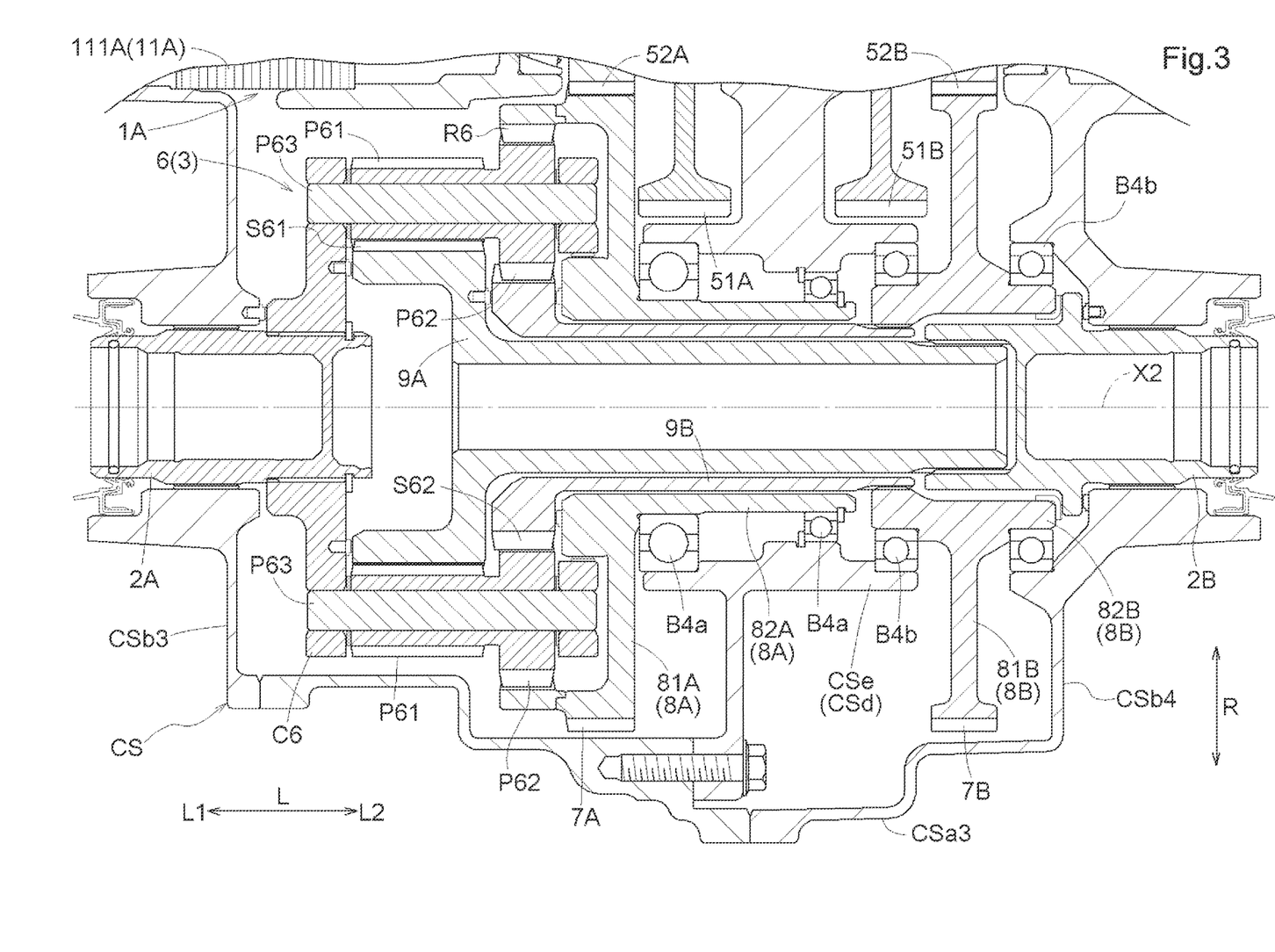
FIG. 3 is a sectional view showing a configuration around a planetary gear mechanism in the vehicle drive device according to the embodiment.

As shown in FIG. 3, the planetary gear mechanism 6 includes: a ring gear R6; a carrier C6 that rotatably supports a first pinion gear P61 and a second pinion gear P62 that rotates integrally with the first pinion gear P61 and meshes with the ring gear R6; a first sun gear S61 that meshes with the first pinion gear P61; and a second sun gear S62 that meshes with the second pinion gear P62.

The ring gear R6 is connected to the first planetary input gear 7A that meshes with the first counter output gear 52A so as to rotate integrally with the first planetary input gear 7A. In the present embodiment, the ring gear R6 is connected to the first planetary input gear 7A via a first connecting member 8A. The first connecting member 8A includes: an annular plate-shaped first gear forming portion 81A extending along the radial direction R with respect to the second axis X2; and a tubular first support portion 82A extended from the inner end portion of the first gear forming portion 81A in the radial direction R toward the second side L2 in the axial direction. In the illustrated example, the first gear forming portion 81A is joined to the end portion of the ring gear R6 on the second side L2 in the axial direction. The first planetary input gear 7A is provided on the outer peripheral surface of the first gear forming portion 81A. Thus, the ring gear R6 rotates integrally with the first planetary input gear 7A.

The carrier C6 is connected to the first output member 2A so as to rotate integrally with the first output member 2A. In the illustrated example, the carrier C6 is connected to the first output member 2A by spline engagement with the first output member 2A passing through the carrier C6 in the axial direction L. The carrier C6 holds a pinion shaft P63 that rotatably supports the first pinion gear P61 and the second pinion gear P62 from the inside thereof in the radial direction R.

The first pinion gear P61 and the second pinion gear P62 are coaxially arranged. The first pinion gear P61 and the second pinion gear P62 rotate around their axes and rotate (revolve) around the second axis X2. A plurality of pairs of the first pinion gear P61 and the second pinion gear P62 is provided along the revolving path thereof. In the example shown in FIG. 4, five first pinion gears P61 and five second pinion gears P62 are provided. In the present embodiment, the first pinion gear P61 has a smaller diameter than the second pinion gear P62.

As shown in FIG. 3, the first sun gear S61 is connected to the second output member 2B so as to rotate integrally with the second output member 2B. In the present embodiment, the first sun gear S61 is connected to the second output member 2B via the first connecting shaft 9A extending along the axial direction L. In the illustrated example, the first sun gear S61 is provided so as to project outward in the radial direction R from the end portion of the first connecting shaft 9A on the first side L1 in the axial direction. The end portion of the first connecting shaft 9A on the second side L2 in the axial direction and the tubular second output member 2B are connected with each other by spline engagement with the end portion of the first connecting shaft 9A on the second side L2 in the axial direction disposed inside the second output member 2B in the radial direction R. Thus, the first sun gear S61 rotates integrally with the second output member 2B. In the present embodiment, the first sun gear S61 has a larger diameter than the second sun gear S62.

The second sun gear S62 is connected to the second planetary input gear 7B that meshes with the second counter output gear 52B so as to rotate integrally with the second planetary input gear 7B. In the present embodiment, the second sun gear S62 is connected to the second planetary input gear 7B via the second connecting shaft 9B and the second connecting member 8B. The second connecting shaft 9B has a tubular shape extending along the axial direction L. The second connecting shaft 9B is disposed outside the first connecting shaft 9A in the radial direction R and inside the first connecting member 8A in the radial direction R. Specifically, the second connecting shaft 9B is disposed such that the inner peripheral surface of the second connecting shaft 9B faces the outer peripheral surface of the first connecting shaft 9A and the outer peripheral surface of the second connecting shaft 9B faces the inner peripheral surface of the first support portion 82A of the first connecting member 8A. The second connecting member 8B includes: an annular plate-shaped second gear forming portion 81B extending along the radial direction R with respect to the second axis X2; and a tubular second support portion 82B extended from the inner end portion of the second gear forming portion 81B in the radial direction R to the opposite sides in the axial direction L. In the illustrated example, the second connecting shaft 9B is provided so as to be extended from the inner end portion of the second sun gear S62 in the radial direction R toward the second side L2 in the axial direction. The end portion of the second connecting shaft 9B on the second side L2 in the axial direction and the second support portion 82B are connected with each other by spline engagement with the end portion of the second connecting shaft 9B on the second side L2 in the axial direction disposed inside the second support portion 82B in the radial direction R. The second planetary input gear 7B is provided on the outer peripheral surface of the second gear forming portion 81B. Thus, the second sun gear S62 rotates integrally with the second planetary input gear 7B.

In the present embodiment, each of the ring gear R6, the first pinion gear P61, the second pinion gear P62, the first sun gear S61, and the second sun gear S62 is a spur gear.

As shown in FIG. 1, in the present embodiment, the arrangement area of the planetary gear mechanism 6 overlaps with the arrangement area of either the first rotary electric machine 1A or the second rotary electric machine 1B in the axial direction L. In the present example, the arrangement area of the planetary gear mechanism 6 in the axial direction L overlaps with the arrangement area of the first rotary electric machine 1A in the axial direction L. On the other hand, the arrangement area of the planetary gear mechanism 6 in the axial direction L does not overlap with the arrangement area of the second rotary electric machine 1B in the axial direction L. Further, in the present example, the first counter output gear 52A is disposed on the first rotary electric machine 1A side in the axial direction L (the first side L1 in the axial direction) with respect to the first counter input gear 51A. The first pinion gear P61 is disposed on the first rotary electric machine 1A side in the axial direction L (the first side L1 in the axial direction) with respect to the second pinion gear P62.

Figure 4:
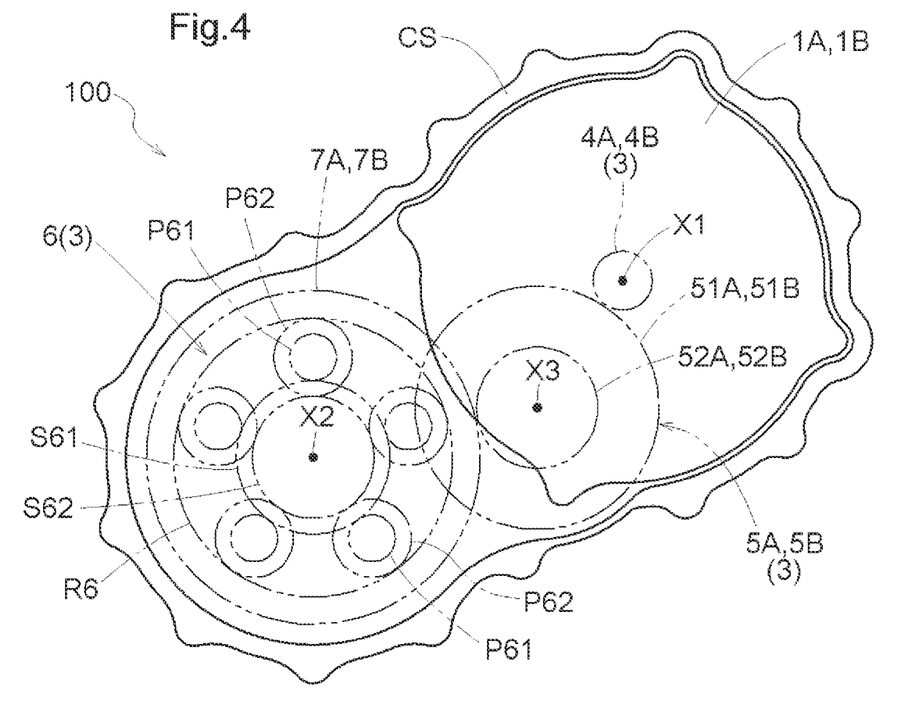
FIG. 4 is a diagram showing a positional relationship of the elements in the vehicle drive device according to the embodiment as seen in the axial direction.

As shown in FIG. 4, in the present embodiment, the planetary gear mechanism 6 is disposed so as to overlap with both the first counter gear mechanism 5A and the second counter gear mechanism 5B as seen in the axial direction along the axial direction L. Further, in the present embodiment, both the first counter gear mechanism 5A and the second counter gear mechanism 5B are disposed so as to overlap with the first rotary electric machine 1A and the second rotary electric machine 1B, as well as the first planetary input gear 7A and the second planetary input gear 7B, as seen in the axial direction along the axial direction L. Here, regarding the arrangement of two elements, "overlap as seen in a specific direction" means that when a virtual straight line parallel to the direction of line of sight is moved in directions orthogonal to the virtual straight line, there is at least an area where the virtual straight line intersects both the two elements.

In the present embodiment, the speed ratio of the power transmission path from the first rotary electric machine 1A to the first output member 2A and the speed ratio of the power transmission path from the second rotary electric machine 1B to the second output member 2B are the same.

Further, in the present embodiment, the number of teeth of each gear (R6, P61, P62, S61, S62) constituting the planetary gear mechanism 6 is set such that the following equation (1) is satisfied.

$$1/Zr = 1/Zs2 - 1/Zs1 \times Zp1/Zp2 \quad (1)$$

Here, in the above equation (1), $Zr$ is the number of teeth of the ring gear R6, $Zp1$ is the number of teeth of the first pinion gear P61, $Zp2$ is the number of teeth of the second pinion gear P62, $Zs1$ is the number of teeth of the first sun gear S61, and $Zs2$ is the number of teeth of the second sun gear S62.

Figure 5:
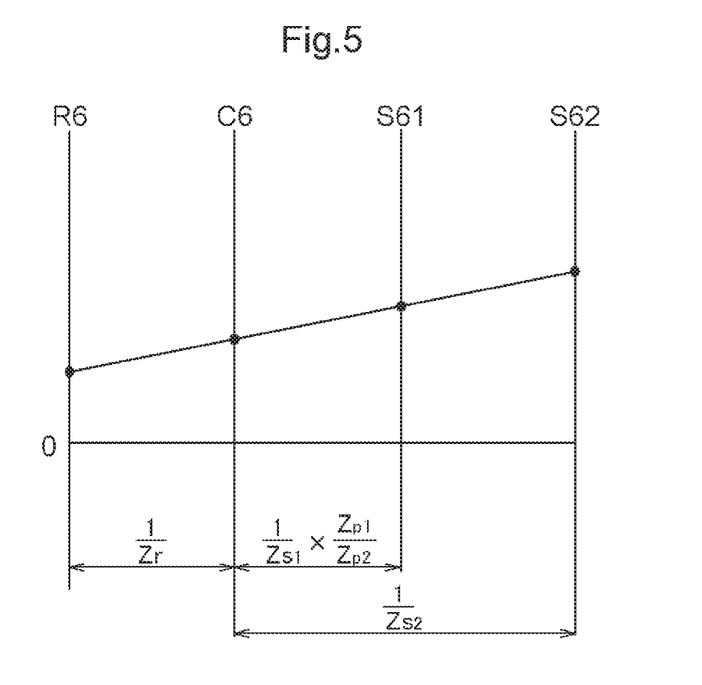
FIG. 5 is a speed diagram of the planetary gear mechanism in the vehicle drive device according to the embodiment.

As shown in FIG. 5, in the above equation (1), "$1/Zr$" represents the ratio of the number of teeth between the ring gear R6 and the carrier C6. Further, "$1/Zs2$" represents the ratio of the number of teeth between the second sun gear S62 and the carrier C6. Further, "$1/Zs1 \times Zp1/Zp2$" represents the ratio of the number of teeth between the first sun gear S61 and the carrier C6. Thus, "$1/Zs2 - 1/Zs1 \times Zp1/Zp2$" represents the ratio of the number of teeth between the second sun gear S62 and the first sun gear S61. That is, the above equation (1) represents that the ratio of the number of teeth between the ring gear R6 and the carrier C6 and the ratio of the number of teeth between the second sun gear S62 and the first sun gear S61 are the same. FIG. 5 is a speed diagram of the planetary gear mechanism 6. In this speed diagram, the vertical axis corresponds to the rotation speed of each rotation element of the planetary gear mechanism 6. Each of the vertical lines arranged in parallel corresponds to each rotation element of the planetary gear mechanism 6.

In the present embodiment, the speed ratio of the first counter gear mechanism 5A and the speed ratio of the second counter gear mechanism 5B are the same. That is, the first counter input gear 51A and the second counter input gear 51B have the same diameter, and the first counter output gear 52A and the second counter output gear 52B have the same diameter.

As described above, the first output member 2A is connected to the first wheel W1 so as to rotate integrally with the first wheel W1, and the second output member 2B is connected to the second wheel W2 so as to rotate integrally with the second wheel W2. The carrier C6 is connected to the first output member 2A so as to rotate integrally with the first output member 2A, and the first sun gear S61 is connected to the second output member 2B so as to rotate integrally with the second output member 2B. Thus, when the vehicle on which the vehicle drive device 100 is mounted travels straight forward, the rotation speed of the carrier C6 and the rotation speed of the first sun gear S61 are equal, and the four rotation elements included in the planetary gear mechanism 6 rotate at the same speed (that is, the planetary gear mechanism 6 does not perform differential operation). In contrast, when the vehicle turns, as shown in FIG. 5 as an example, the four rotation elements included in the planetary gear mechanism 6 rotate at different rotation speeds (that is, the planetary gear mechanism 6 performs differential operation). FIG. 5 shows a state in which the vehicle is turning in such a direction that the first wheel W1 serves as the inner wheel (the wheel on the side closer to the turning center).

Thus, the scene where the planetary gear mechanism 6 performs differential operation is limited to the time when the vehicle turns. As described above, in the present embodiment, the gears (R6, P61, P62, S61, S62) constituting the planetary gear mechanism 6 are spur gears. The scene where the planetary gear mechanism 6 performs differential operation is limited to the time when the vehicle turns, so it is possible to minimize the influence of a gear noise that may occur when the planetary gear mechanism 6 performs differential operation. Further, by using spur gears for the gears (R6, P61, P62, S61, S62) constituting the planetary gear mechanism 6, a load received by each gear can be made mainly a radial load, and thus, the configuration for supporting each gear in the axial direction L can be simplified.

Hereinafter, a support configuration for the members of the vehicle drive device 100 of the present embodiment with respect to the case CS will be described.

As shown in FIG. 1, the case CS includes a first peripheral wall portion CSa1, a second peripheral wall portion CSa2, a third peripheral wall portion CSa3, a first side wall portion CSb1, a second side wall portion CSb2, a third side wall portion CSb3, a fourth side wall portion CSb4, a first partition wall portion CSc1, a second partition wall portion CSc2, and a support wall portion CSd.

The first peripheral wall portion CSa1 has a tubular shape surrounding the outside of the first rotary electric machine 1A in the radial direction R. The second peripheral wall portion CSa2 has a tubular shape surrounding the outside of the second rotary electric machine 1B in the radial direction R. The third peripheral wall portion CSa3 is disposed between the first peripheral wall portion CSa1 and the second peripheral wall portion CSa2 in the axial direction L. The third peripheral wall portion CSa3 has a tubular shape surrounding the outside of the power transmission device 3.

The first side wall portion CSb1 is provided so as to close the opening of the first peripheral wall portion CSa1 on the first side L1 in the axial direction. The second side wall portion CSb2 is provided so as to close the opening of the second peripheral wall portion CSa2 on the second side L2 in the axial direction. The third side wall portion CSb3 is provided so as to close the opening of the third peripheral wall portion CSa3 on the first side L1 in the axial direction, which faces the outside of the case CS. The third side wall portion CSb3 is provided with a through hole through which the first output member 2A is inserted. The fourth side wall portion CSb4 is provided so as to close the opening of the third peripheral wall portion CSa3 on the second side L2 in the axial direction, which faces the outside of the case CS. The fourth side wall portion CSb4 is provided with a through hole through which the second output member 2B is inserted.

The first partition wall portion CSc1 is disposed so as to partition the inner space of the case CS into a portion in which the first rotary electric machine 1A is accommodated and a portion in which the first input gear 4A, the second input gear 4B, the first counter gear mechanism 5A, and the second counter gear mechanism 5B are accommodated. The second partition wall portion CSc2 is disposed so as to partition the inner space of the case CS into a portion in which the second rotary electric machine 1B is accommodated and a portion in which the first input gear 4A, the second input gear 4B, the first counter gear mechanism 5A, and the second counter gear mechanism 5B are accommodated.

The support wall portion CSd is disposed between the first input gear 4A and the second input gear 4B, between the first counter gear mechanism 5A and the second counter gear mechanism 5B, and between the first planetary input gear 7A and the second planetary input gear 7B. In the illustrated example, the support wall portion CSd is fastened to the first partition wall portion CSc1 with bolts from the second side L2 in the axial direction.

In the present embodiment, the first rotor shaft 13A is rotatably supported with respect to the case CS by a pair of first rotor bearings B1a arranged at different positions in the axial direction L. Specifically, the first rotor bearing B1a on the first side L1 in the axial direction is supported by the first side wall portion CSb1, and rotatably supports the end portion of the first rotor shaft 13A on the first side L1 in the axial direction. The first rotor bearing B1a on the second side L2 in the axial direction is disposed in a through hole passing through the first partition wall portion CSc1 in the axial direction L, and rotatably supports the end portion of the first rotor shaft 13A on the second side L2 in the axial direction.

In the present embodiment, the second rotor shaft 13B is rotatably supported with respect to the case CS by a pair of second rotor bearings B1b arranged at different positions in the axial direction L. Specifically, the second rotor bearing B1b on the second side L2 in the axial direction is supported by the second side wall portion CSb2, and rotatably supports the end portion of the second rotor shaft 13B on the second side L2 in the axial direction. The second rotor bearing B1b on the first side L1 in the axial direction is disposed in a through hole passing through the second partition wall portion CSc2 in the axial direction L, and rotatably supports the end portion of the second rotor shaft 13B on the first side L1 in the axial direction.

In the present embodiment, the first input shaft 14A is rotatably supported by the first input bearing B2a with respect to the case CS. Specifically, the first input bearing B2a is supported by the support wall portion CSd, and rotatably supports the end portion of the first input shaft 14A on the second side L2 in the axial direction.

In the present embodiment, the second input shaft 14B is rotatably supported by the second input bearing B2b with respect to the case CS. Specifically, the second input bearing B2b is supported by the support wall portion CSd, and rotatably supports the end portion of the second input shaft 14B on the first side L1 in the axial direction.

In the present embodiment, the first counter gear mechanism 5A is rotatably supported with respect to the case CS by a pair of first counter bearings B3a arranged at different positions in the axial direction L. Specifically, the first counter bearing B3a on the first side L1 in the axial direction is supported by the first partition wall portion CSc1, and rotatably supports the end portion of the first counter shaft 53A on the first side L1 in the axial direction. The first counter bearing B3a on the second side L2 in the axial direction is supported by the support wall portion CSd, and rotatably supports the end portion of the first counter shaft 53A on the second side L2 in the axial direction.

In the present embodiment, the second counter gear mechanism 5B is rotatably supported with respect to the case CS by a pair of second counter bearings B3b arranged at different positions in the axial direction L. Specifically, the second counter bearing B3b on the second side L2 in the axial direction is supported by the second partition wall portion CSc2, and rotatably supports the end portion of the second counter shaft 53B on the second side L2 in the axial direction. The second counter bearing B3b on the first side L1 in the axial direction is supported by the support wall portion CSd, and rotatably supports the end portion of the second counter shaft 53B on the first side L1 in the axial direction.

As shown in FIG. 3, in the present embodiment, the first connecting member 8A is rotatably supported with respect to the case CS by a pair of first connecting bearings B4a arranged at different positions in the axial direction L. Specifically, the support wall portion CSd includes a tubular portion CSe having a tubular shape, through which the first connecting shaft 9A, the second connecting shaft 9B, the first support portion 82A, and the second support portion 82B are inserted. The pair of first connecting bearings B4a are interposed between the inner peripheral surface of the tubular portion CSe and the outer peripheral surface of the first support portion 82A.

In the present embodiment, the second connecting member 8B is rotatably supported with respect to the case CS by a pair of second connecting bearings B4b arranged at different positions in the axial direction L. Specifically, one second connecting bearing B4b is disposed more toward the first side L1 in the axial direction than the second gear forming portion 81B, and the other second connecting bearing B4b is disposed more toward the second side L2 in the axial direction than the second gear forming portion 81B. The second connecting bearing B4b on the first side L1 in the axial direction is interposed between the inner peripheral surface of the tubular portion CSe and the outer peripheral surface of a portion of the second support portion 82B, which is more toward the first side L1 in the axial direction than the second gear forming portion 81B. On the other hand, the second connecting bearing B4b on the second side L2 in the axial direction is supported by the fourth side wall portion CSb4, and rotatably supports a portion of the second support portion 82B, which is more toward the second side L2 in the axial direction than the second gear forming portion 81B.

Figure 6:
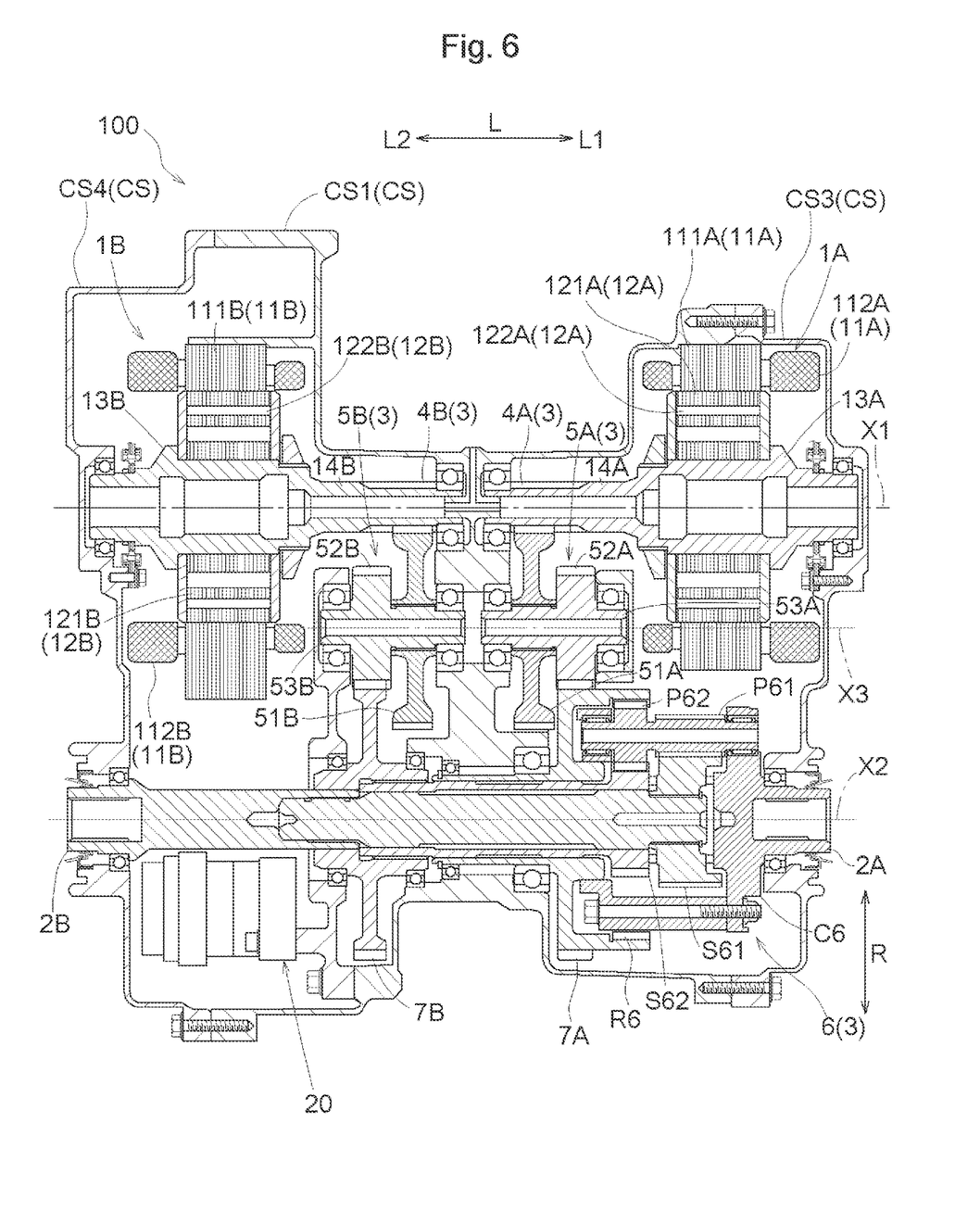
FIG. 6 is a sectional view taken along the axial direction of a vehicle drive device according to another embodiment.

Hereinafter, another embodiment of the vehicle drive device 100 that has been described above with reference to FIG. 1 will be described with reference to FIG. 6. In FIG. 6, the components having the same functions as those of the vehicle drive device 100 shown in FIG. 1 are denoted by the same reference signs as those in FIG. 1.

The case CS of the vehicle drive device 100 shown in FIG. 1 includes four members, that is, a first case CS1, a second case CS2, a third case CS3, and a fourth case CS4. The first case CS is a body case provided therein with the first partition wall portion CSc1 that supports the first rotary electric machine 1A. The second case CS2 is a body case provided therein with the second partition wall portion CSc2 that supports the second rotary electric machine 1B. The first case CS1 and the second case CS2 are connected to each other such that their respective one sides in the axial direction (L) where the rotary electric machine is not accommodated are in contact with each other. The third case CS3 is a cover case that is connected to the first case CS1 on the side where the first case CS1 accommodates the first rotary electric machine 1A (the first side L1 in the axial direction). The fourth case CS4 is a cover case that is connected to the second case CS2 on the side where the second case CS2 accommodates the second rotary electric machine 1B (the second side L2 in the axial direction).

In contrast, the case CS of the vehicle drive device 100 shown in FIG. 6 is composed of three members, in which the first case CS1 is integrally formed with the second case CS2 as the body case, and the third case CS3 and the fourth case CS4 serve as the cover cases. The first rotary electric machine 1A is accommodated in the first case CS1 on the first side L1 in the axial direction, and the second rotary electric machine 1B is accommodated in the first case CS1 on the second side L2 in the axial direction. The third case CS3 is connected to the first case CS1 on the side where the first case CS1 accommodates the first rotary electric machine 1A (the first side L1 in the axial direction). The fourth case CS4 is connected to the first case CS1 on the side where the first case CS1 accommodates the second rotary electric machine 1B (the second side L2 in the axial direction).

When the body case is composed of two members as in the vehicle drive device 100 shown in FIG. 1, a connecting portion for connecting the first case CS1 and the second case CS2 is necessary. In the vehicle drive device 100 of the other embodiment shown in FIG. 6, however, such a connecting portion is unnecessary. Therefore, the center portion in the axial direction L, that is, the portion where the first rotary electric machine 1A and the second rotary electric machine 1B face each other can be reduced in length in the radial direction R, thereby further reducing the size of the vehicle drive device 100.

As shown in FIG. 6, also in the other embodiment, the arrangement area of the planetary gear mechanism 6 overlaps with the arrangement area of either the first rotary electric machine 1A or the second rotary electric machine 1B in the axial direction L, as in the vehicle drive device 100 of FIG. 1. Also in the other embodiment, the arrangement area of the planetary gear mechanism 6 in the axial direction L overlaps with the arrangement area of the first rotary electric machine 1A in the axial direction L, and the arrangement area of the planetary gear mechanism 6 in the axial direction L does not overlap with the arrangement area of the second rotary electric machine 1B in the axial direction L. Further, also in the other embodiment, the first counter output gear 52A is disposed on the first rotary electric machine 1A side in the axial direction L (the first side L1 in the axial direction) with respect to the first counter input gear 51A. The first pinion gear P61 is disposed on the first rotary electric machine 1A side in the axial direction L (the first side L1 in the axial direction) with respect to the second pinion gear P62.

For the other embodiment, the presentation of a diagram showing the positional relationship seen in the axial direction along the axial direction L is omitted. As is clear from FIG. 6, however, also in the other embodiment, the planetary gear mechanism 6 is disposed so as to overlap with both the first counter gear mechanism 5A and the second counter gear mechanism 5B as seen in the axial direction. Further, also in the other embodiment, both the first counter gear mechanism 5A and the second counter gear mechanism 5B are disposed so as to overlap with the first rotary electric machine 1A and the second rotary electric machine 1B, as well as the first planetary input gear 7A and the second planetary input gear 7B, as seen in the axial direction.

Further, as shown in FIG. 6, in the vehicle drive device 100 of the other embodiment, the oil pump 20 is disposed on the opposite side of the first counter output gear 52A and the second counter output gear 52B from the planetary gear mechanism 6 in the axial direction L. Thus, in the other embodiment, the vehicle drive device 100 including the oil pump 20 is appropriately configured without increasing the size of the vehicle drive device 100.

Here, the arrangement area of the oil pump 20 in the axial direction L overlaps with the arrangement area of the second rotary electric machine 1B in the axial direction L. As described above, the arrangement area of the planetary gear mechanism 6 in the axial direction L overlaps with the arrangement area of the first rotary electric machine 1A in the axial direction L. The planetary gear mechanism 6 and the oil pump 20 are arranged such that their arrangement areas in the axial direction L each overlap with the arrangement area of the corresponding rotary electric machine in the axial direction L, so the vehicle drive device 100 is realized in which the members are arranged in a well-balanced manner in the axial direction L.

Other Embodiments (1) In the above embodiments, a configuration has been described as an example in which the first counter input gear 51A has a larger diameter than the first counter output gear 52A, the second counter input gear 51B has a larger diameter than the second counter output gear 52B, and the first counter input gear 51A and the second counter input gear 51B are arranged between the first counter output gear 52A and the second counter output gear 52B in the axial direction L. However, the present disclosure is not limited to such a configuration. For example, the first counter input gear 51A may have a smaller diameter than the first counter output gear 52A, and the second counter input gear 51B may have a smaller diameter than the second counter output gear 52B. In this case, the first counter output gear 52A and the second counter output gear 52B are preferably arranged between the first counter input gear 51A and the second counter input gear 51B in the axial direction L.

(2) In the above embodiments, a configuration has been described as an example, in which the arrangement area of the planetary gear mechanism 6 overlaps with the arrangement area of either the first rotary electric machine 1A or the second rotary electric machine 1B in the axial direction L. However, the present disclosure is not limited to such a configuration. A configuration may be adopted in which the arrangement area of the planetary gear mechanism 6 in the axial direction L does not overlap with the arrangement area of either the first rotary electric machine 1A or the second rotary electric machine 1B in the axial direction L. Alternatively, a configuration may be adopted in which the arrangement area of the planetary gear mechanism 6 in the axial direction L overlaps with the arrangement areas of both the first rotary electric machine 1A and the second rotary electric machine 1B in the axial direction L.

(3) In the above embodiments, a configuration has been described as an example, in which the planetary gear mechanism 6 is disposed so as to overlap with both the first counter gear mechanism 5A and the second counter gear mechanism 5B as seen in the axial direction along the axial direction L. However, the present disclosure is not limited to such a configuration. The planetary gear mechanism 6 may be disposed so as to overlap with only one of the first counter gear mechanism 5A and the second counter gear mechanism 5B as seen in the axial direction along the axial direction L. Alternatively, the planetary gear mechanism 6 may be disposed so as not to overlap with either the first counter gear mechanism 5A or the second counter gear mechanism 5B as seen in the axial direction along the axial direction L.

(4) In the above embodiments, a configuration has been described as an example, in which the speed ratio of the power transmission path from the first rotary electric machine 1A to the first output member 2A and the speed ratio of the power transmission path from the second rotary electric machine 1B to the second output member 2B are the same. However, the present disclosure is not limited to such a configuration. A configuration may be adopted, in which the speed ratio of the power transmission path from the first rotary electric machine 1A to the first output member 2A and the speed ratio of the power transmission path from the second rotary electric machine 1B to the second output member 2B are different. In this case, the rotation speed of the first rotor 12A and the rotation speed of the second rotor 12B when the vehicle on which the vehicle drive device 100 is mounted travels straight forward are different. Accordingly, for the first rotary electric machine 1A and the second rotary electric machine 1B, rotary electric machines having different output characteristics may be used, for example.

(5) In the above embodiments, a configuration has been described as an example, in which the ratio of the number of teeth between the ring gear R6 and the carrier C6 and the ratio of the number of teeth between the second sun gear S62 and the first sun gear S61 are the same, and the speed ratio of the first counter gear mechanism 5A and the speed ratio of the second counter gear mechanism 5B are the same. However, the present disclosure is not limited to such a configuration. A configuration may be adopted, in which the ratio of the number of teeth between the ring gear R6 and the carrier C6 and the ratio of the number of teeth between the second sun gear S62 and the first sun gear S61 are different, and the speed ratio of the first counter gear mechanism 5A and the speed ratio of the second counter gear mechanism 5B are different. This configuration can be applied regardless of whether the speed ratio of the power transmission path from the first rotary electric machine 1A to the first output member 2A and the speed ratio of the power transmission path from the second rotary electric machine 1B to the second output member 2B are the same or different.

(6) In the above embodiments, a configuration has been described as an example, in which the number of teeth of each gear (R6, P61, P62, S61, S62) constituting the planetary gear mechanism 6 is set such that the equation of $1/Zr = 1/Zs2 - 1/Zs1 \times Zp1/Zp2$ is satisfied. However, the present disclosure is not limited to such a configuration. For example, the number of teeth of each gear (R6, P61, P62, S61, S62) constituting the planetary gear mechanism 6 may be set such that $Zr:Zs2:Zs1 = 2:1:2$ is satisfied assuming that $Zp1 = Zp2$. This makes it possible to set the output torque difference of the planetary gear mechanism 6 (a difference between the torque output from the carrier C6 and the torque output from the first sun gear S61) to three times the input torque difference of the planetary gear mechanism 6 (a difference between the torque input to the ring gear R6 and the torque input to the second sun gear S62).

(7) In the above embodiments, a configuration has been described as an example, in which both the first driving force source and the second driving force source are rotary electric machines. However, the present disclosure is not limited to such a configuration. A driving force source other than the rotary electric machine can be used as one or both of the first driving force source and the second driving force source. Examples of the driving force source used in place of the rotary electric machine include an internal combustion engine. The internal combustion engine is a motor (gasoline engine, diesel engine, and the like) that is driven by combustion of fuel inside the engine to take out driving force.

(8) The configurations disclosed in the above-described embodiments can be applied in combination with the configurations disclosed in other embodiments as long as there is no contradiction. With respect to the other configurations, the embodiments disclosed herein are merely exemplary in all respects. Therefore, various modifications can be made as appropriate without departing from the scope of the present disclosure.

Outline of Embodiments Described Above

Hereinafter, the outline of the vehicle drive device (100) described above will be described.

A vehicle drive device (100) includes: a first driving force source (1A); a second driving force source (1B); a first output member (2A) drivingly connected to a first wheel (W1); a second output member (2B) drivingly connected to a second wheel (W2); and a power transmission device (3). The first driving force source (1A) and the second driving force source (1B) are arranged on a first axis (X1). The first output member (2A) and the second output member (2B) are arranged on a second axis (X2) that is different from the first axis (X1). The power transmission device (3) includes: a first gear (4A) that rotates integrally with a rotating body (12A) of the first driving force source (1A); a second gear (4B) that rotates integrally with a rotating body (12B) of the second driving force source (1B); a first counter gear mechanism (5A) and a second counter gear mechanism (5B) arranged on a third axis (X3) that is different from the first axis (X1) and the second axis (X2); and a planetary gear mechanism (6) arranged on the second axis (X2). The first counter gear mechanism (5A) includes: a third gear (51A) that meshes with the first gear (4A); and a fourth gear (52A) that rotates integrally with the third gear (51A). The second counter gear mechanism (5B) includes: a fifth gear (51B) that meshes with the second gear (4B); and a sixth gear (52B) that rotates integrally with the fifth gear (51B). The planetary gear mechanism (6) is configured to transmit rotation of the fourth gear (52A) and the sixth gear (52B) to the first output member (2A) and the second output member (2B) and is disposed so as to overlap both the first counter gear mechanism (5A) and the second counter gear mechanism (5B) as seen in an axial direction along an axial direction (L).

In this configuration, rotation of the first driving force source (1A) is input to the planetary gear mechanism (6) via the first counter gear mechanism (5A). The rotation of the second driving force source (1B) is input to the planetary gear mechanism (6) via the second counter gear mechanism (5B). This facilitates changing the speed of the rotation input to the planetary gear mechanism (6) such that the rotation speeds of the rotation elements of the planetary gear mechanism (6) become appropriate rotation speeds. Thus, the load on the planetary gear mechanism (6) can be kept small. In this configuration, the first driving force source (1A) and the second driving force source (1B) are arranged on the first axis (X1). The first output member (2A), the second output member (2B), and the planetary gear mechanism (6) are arranged on the second axis (X2). Further, the first counter gear mechanism (5A) and the second counter gear mechanism (5B) are arranged on the third axis (X3). That is, the components of the vehicle drive device (100) are separately arranged on the three axes (X1, X2, X3). This makes it possible to suppress an increase in dimension of the vehicle drive device (100) in the axial direction (L), as compared with the configuration in which the components of the vehicle drive device (100) are arranged coaxially. With this configuration, a torque difference between the first output member (2A) and the second output member (2B) can be appropriately controlled by one planetary gear mechanism (6). Thus, the vehicle drive device (100) can have a simple configuration. As a result, the manufacturing cost of the vehicle drive device (100) can be reduced. In this configuration, the planetary gear mechanism (6) is disposed using a space overlapping with both the first counter gear mechanism (5A) and the second counter gear mechanism (5B) as seen in the axial direction. This makes it possible to suppress the increase in dimension of the vehicle drive device (100) in the radial direction (R) due to the placement of the planetary gear mechanism (6). Thus, with this configuration, it is possible to realize a vehicle drive device capable of suppressing the increase in radial dimension while ensuring a sufficient speed reduction ratio.

It is preferable that an arrangement area of the planetary gear mechanism (6) in the axial direction (L) overlap with an arrangement area of either the first driving force source (1A) or the second driving force source (1B).

This configuration makes it easier to keep the dimension of the vehicle drive device (100) in the axial direction (L) small, compared with a configuration in which the arrangement area of the planetary gear mechanism (6) in the axial direction (L) does not overlap with the arrangement area of either the first driving force source (1A) or the second driving force source (1B) in the axial direction (L).

In the configuration in which the arrangement area of the planetary gear mechanism (6) in the axial direction (L) overlaps with the arrangement area of either the first driving force source (1A) or the second driving force source (1B), it is preferable that the fourth gear (52A) be disposed on the first driving force source (1A) side in the axial direction (L) with respect to the third gear (51A); and the arrangement area of the planetary gear mechanism (6) in the axial direction (L) overlap with the arrangement area of the first driving force source (1A) in the axial direction (L).

With this configuration, it is easy to dispose the fourth gear (52A) that meshes with the planetary gear mechanism (6) close to the first driving force source (1A) in the axial direction (L). This makes it easier to keep the dimension of the vehicle drive device (100) in the axial direction (L) small.

In the configuration in which the planetary gear mechanism (6) includes: a ring gear (R6); a carrier (C6) that rotatably supports a first pinion gear (P61) and a second pinion gear (P62) that rotates integrally with the first pinion gear (P61) and meshes with the ring gear (R6); a first sun gear (S61) that meshes with the first pinion gear (P61); and a second sun gear (S62) that meshes with the second pinion gear (P62), and the arrangement area of the planetary gear mechanism (6) in the axial direction (L) overlaps with the arrangement area of either the first driving force source (1A) or the second driving force source (1B), it is preferable that the first pinion gear (P61) be disposed on the first driving force source (1A) side in the axial direction (L) with respect to the second pinion gear (P62), and the arrangement area of the planetary gear mechanism (6) in the axial direction (L) overlap with the arrangement area of the first driving force source (1A) in the axial direction (L).

With this configuration, it is easy to dispose the first pinion gear (P61) such that the arrangement area thereof in the axial direction (L) overlaps with the arrangement area of the first driving force source (1A) in the axial direction (L), as well as dispose the ring gear (R6) that meshes with the second pinion gear (P62) such that the arrangement area of the ring gear (R6) in the axial direction (L) does not overlap with the arrangement area of the first driving force source (1A) in the axial direction (L). This makes it easier to dispose the planetary gear mechanism (6) such that the arrangement area thereof in the axial direction (L) overlaps with the arrangement area of the first driving force source (1A) in the axial direction (L) and dispose the planetary gear mechanism (6) close to the first driving force source (1A) in the radial direction (R). Thus, it becomes easier to keep the dimension of the vehicle drive device (100) in the axial direction (L) small while keeping the dimension of the vehicle drive device (100) in the radial direction (R) small.

It is preferable that the planetary gear mechanism (6) include: a ring gear (R6); a carrier (C6) that rotatably supports a first pinion gear (P61) and a second pinion gear (P62) that rotates integrally with the first pinion gear (P61) and meshes with the ring gear (R6); a first sun gear (S61) that meshes with the first pinion gear (P61); and a second sun gear (S62) that meshes with the second pinion gear (P62), and the ring gear (R6) be connected to a seventh gear (7A) that meshes with the fourth gear (52A), so as to rotate integrally with the seventh gear (7A), the carrier (C6) be connected to the first output member (2A) so as to rotate integrally with the first output member (2A), the first sun gear (S61) be connected to the second output member (2B) so as to rotate integrally with the second output member (2B), and the second sun gear (S62) be connected to an eighth gear (7B) that meshes with the sixth gear (52B), so as to rotate integrally with the eighth gear (7B).

With this configuration, the planetary gear mechanism (6) that can appropriately control a torque difference between the first output member (2A) and the second output member (2B) can be configured appropriately.

Here, it is preferable that the first counter gear mechanism (5A) reduce a speed of rotation from the first gear (4A) and transmit the rotation to the seventh gear (7A), and the second counter gear mechanism (5B) reduce a speed of rotation from the second gear (4B) and transmit the rotation to the eighth gear (7B).

With this configuration, it becomes easier to ensure a desired torque without increasing the sizes of the first driving force source (1A) and the second driving force source (1B). Thus, it is possible to suppress increase in size of the vehicle drive device (100).

Further, it is preferable that the third gear (51A) have a larger diameter than the fourth gear (52A), the fifth gear (51B) have a larger diameter than the sixth gear (52B), and the third gear (51A) and the fifth gear (51B) be arranged between the fourth gear (52A) and the sixth gear (52B) in the axial direction (L).

In this configuration, the third gear (51A) and the fifth gear (51B) having relatively large dimensions in the radial direction (R) are arranged between the fourth gear (52A) and the sixth gear (52B) in the axial direction (L). Therefore, it is easy to dispose the planetary gear mechanism (6) close to the first counter gear mechanism (5A) and the second counter gear mechanism (5B) in the axial direction (L), compared with a configuration in which the third gear (51A) and the fifth gear (51B) are arranged such that the fourth gear (52A) and the sixth gear (52B) are sandwiched therebetween in the axial direction (L). This makes it easier to keep the dimension of the vehicle drive device (100) in the axial direction (L) small.

Further, it is preferable that a speed ratio of a power transmission path from the first driving force source (1A) to the first output member (2A) and a speed ratio of a power transmission path from the second driving force source (1B) to the second output member (2B) be the same.

With this configuration, by making an output torque of the first driving force source (1A) and an output torque of the second driving force source (1B) the same, a torque difference between the first output member (2A) and the second output member (2B) can be made zero. Thus, the torque difference between the first output member (2A) and the second output member (2B) can be easily controlled.

In the configuration in which the planetary gear mechanism (6) includes: a ring gear (R6); a carrier (C6) that rotatably supports a first pinion gear (P61) and a second pinion gear (P62) that rotates integrally with the first pinion gear (P61) and meshes with the ring gear (R6); a first sun gear (S61) that meshes with the first pinion gear (P61); and a second sun gear (S62) that meshes with the second pinion gear (P62), and the speed ratio of the power transmission path from the first driving force source (1A) to the first output member (2A) and the speed ratio of the power transmission path from the second driving force source (1B) to the second output member (2B) are the same, a ratio of the number of teeth between the ring gear (R6) and the carrier (C6) and a ratio of the number of teeth between the second sun gear (S62) and the first sun gear (S61) may be different, and the speed ratio of the first counter gear mechanism (5A) and the speed ratio of the second counter gear mechanism (5B) may be different.

In this configuration, when the speed ratio is the same over the power transmission path from the first driving force source (1A) to the first output member (2A) and the power transmission path from the second driving force source (1B) to the second output member (2B) as a whole, it is not necessary to make the speed ratios the same in various parts of those power transmission paths. Thus, flexibility in setting the speed ratios of the first counter gear mechanism (5A), the second counter gear mechanism (5B), and the planetary gear mechanism (6) can be increased.

Further, in the configuration in which the planetary gear mechanism (6) includes: a ring gear (R6); a carrier (C6) that rotatably supports a first pinion gear (P61) and a second pinion gear (P62) that rotates integrally with the first pinion gear (P61) and meshes with the ring gear (R6); a first sun gear (S61) that meshes with the first pinion gear (P61); and a second sun gear (S62) that meshes with the second pinion gear (P62), it is preferable that when the number of teeth of the ring gear (R6) is Zr, the number of teeth of the first pinion gear (P61) is Zp1, the number of teeth of the second pinion gear (P62) is Zp2, the number of teeth of the first sun gear (S61) is Zs1, and the number of teeth of the second sun gear (S62) is Zs2, $1/Zr=1/Zs2 -1/Zs1 \times Zp1/Zp2$ be satisfied.

In this configuration, the ratio of the number of teeth between the ring gear (R6) and the carrier (C6) and the ratio of the number of teeth between the second sun gear (S62) and the first sun gear (S61) are the same. This makes it easier to control the torque difference between the first output member (2A) and the second output member (2B).

Further, it is preferable that an oil pump (20) be disposed on an opposite side of the fourth gear (52A) and the sixth gear (52B) from the planetary gear mechanism (6) in the axial direction (L).

With this configuration, the vehicle drive device (100) including the oil pump (20) can be appropriately configured without increasing the size of the vehicle drive device (100).

DESCRIPTION OF THE REFERENCE NUMERALS

100: vehicle drive device, 1A: first rotary electric machine (first driving force source), 1B: second rotary electric machine (second driving force source), 2A: first output member, 2B: second output member, 3: power transmission device, 4A: first input gear (first gear), 4B: second input gear (second gear), 5A: first counter gear mechanism, 51A: first counter input gear (third gear), 52A: first counter output gear (fourth gear), 5B: second counter gear mechanism, 51B: second counter input gear (fifth gear), 52B: second counter output gear (sixth gear), 6: planetary gear mechanism, 7A: first planetary input gear (seventh gear), 7B: second planetary input gear (eighth gear), 20: oil pump, X1: first axis, X2: second axis, X3: third axis, W1: first wheel, W2: second wheel

The invention claimed is:

1. A vehicle drive device comprising:
a first driving force source;
a second driving force source;
a first output member drivingly connected to a first wheel;
a second output member drivingly connected to a second wheel; and
a power transmission device, wherein:
the first driving force source and the second driving force source are arranged on a first axis;
the first output member and the second output member are arranged on a second axis that is different from the first axis;
the power transmission device includes a first gear that rotates integrally with a rotating body of the first driving force source, a second gear that rotates integrally with a rotating body of the second driving force source, a first counter gear mechanism and a second counter gear mechanism arranged on a third axis that is different from the first axis and the second axis, and a planetary gear mechanism disposed on the second axis;
the first counter gear mechanism includes a third gear that meshes with the first gear, and a fourth gear that rotates integrally with the third gear;
the second counter gear mechanism includes a fifth gear that meshes with the second gear, and a sixth gear that rotates integrally with the fifth gear;
the planetary gear mechanism is configured to transmit rotation of the fourth gear and the sixth gear to the first output member and the second output member and is disposed so as to overlap with both the first counter gear mechanism and the second counter gear mechanism as seen in an axial direction along an axial direction; and
an arrangement area of the planetary gear mechanism in the axial direction overlaps with an arrangement area of either the first driving force source or the second driving force source.

2. The vehicle drive device according to claim 1, wherein the arrangement area of the planetary gear mechanism in the axial direction overlaps with the arrangement area of the first driving force source in the axial direction.

3. The vehicle drive device according to claim 1, wherein:
the planetary gear mechanism includes a ring gear, a carrier that rotatably supports a first pinion gear and a second pinion gear that rotates integrally with the first pinion gear and meshes with the ring gear, a first sun gear that meshes with the first pinion gear, and a second sun gear that meshes with the second pinion gear;
the first pinion gear is disposed on the first driving force source side in the axial direction with respect to the second pinion gear; and
the arrangement area of the planetary gear mechanism in the axial direction overlaps with the arrangement area of the first driving force source in the axial direction.

4. The vehicle drive device according to claim 1, wherein:
the third gear has a larger diameter than the fourth gear;
the fifth gear has a larger diameter than the sixth gear; and
the third gear and the fifth gear are arranged between the fourth gear and the sixth gear in the axial direction.

5. The vehicle drive device according to claim 1, wherein a speed ratio of a power transmission path from the first driving force source to the first output member and a speed ratio of a power transmission path from the second driving force source to the second output member are the same.

6. A vehicle drive device comprising:
a first driving force source;
a second driving force source;
a first output member drivingly connected to a first wheel;
a second output member drivingly connected to a second wheel; and
a power transmission device, wherein:
the first driving force source and the second driving force source are arranged on a first axis;
the first output member and the second output member are arranged on a second axis that is different from the first axis;
the power transmission device includes a first gear that rotates integrally with a rotating body of the first driving force source, a second gear that rotates integrally with a rotating body of the second driving force source, a first counter gear mechanism and a second counter gear mechanism arranged on a third axis that is different from the first axis and the second axis, and a planetary gear mechanism disposed on the second axis;
the first counter gear mechanism includes a third gear that meshes with the first gear, and a fourth gear that rotates integrally with the third gear;
the second counter gear mechanism includes a fifth gear that meshes with the second gear, and a sixth gear that rotates integrally with the fifth gear;
the planetary gear mechanism is configured to transmit rotation of the fourth gear and the sixth gear to the first output member and the second output member and is disposed so as to overlap with both the first counter gear mechanism and the second counter gear mechanism as seen in an axial direction along an axial direction;
the planetary gear mechanism includes a ring gear, a carrier that rotatably supports a first pinion gear and a second pinion gear that rotates integrally with the first pinion gear and meshes with the ring gear, a first sun gear that meshes with the first pinion gear, and a second sun gear that meshes with the second pinion gear;
the ring gear is connected to a seventh gear that meshes with the fourth gear, so as to rotate integrally with the seventh gear;
the carrier is connected to the first output member so as to rotate integrally with the first output member;
the first sun gear is connected to the second output member so as to rotate integrally with the second output member; and
the second sun gear is connected to an eighth gear that meshes with the sixth gear, so as to rotate integrally with the eighth gear.

7. The vehicle drive device according to claim 6, wherein:
the first counter gear mechanism reduces a speed of rotation from the first gear and transmits the rotation to the seventh gear; and
the second counter gear mechanism reduces a speed of rotation from the second gear and transmits the rotation to the eighth gear.

8. A vehicle drive device comprising:
a first driving force source;
a second driving force source;
a first output member drivingly connected to a first wheel;
a second output member drivingly connected to a second wheel; and
a power transmission device, wherein:
the first driving force source and the second driving force source are arranged on a first axis;
the first output member and the second output member are arranged on a second axis that is different from the first axis;
the power transmission device includes a first gear that rotates integrally with a rotating body of the first driving force source, a second gear that rotates integrally with a rotating body of the second driving force source, a first counter gear mechanism and a second counter gear mechanism arranged on a third axis that is different from the first axis and the second axis, and a planetary gear mechanism disposed on the second axis;
the first counter gear mechanism includes a third gear that meshes with the first gear, and a fourth gear that rotates integrally with the third gear;
the second counter gear mechanism includes a fifth gear that meshes with the second gear, and a sixth gear that rotates integrally with the fifth gear;
the planetary gear mechanism is configured to transmit rotation of the fourth gear and the sixth gear to the first output member and the second output member and is disposed so as to overlap with both the first counter gear mechanism and the second counter gear mechanism as seen in an axial direction along an axial direction;
a speed ratio of a power transmission path from the first driving force source to the first output member and a speed ratio of a power transmission path from the second driving force source to the second output member are the same;
the planetary gear mechanism includes a ring gear, a carrier that rotatably supports a first pinion gear and a second pinion gear that rotates integrally with the first pinion gear and meshes with the ring gear, a first sun gear that meshes with the first pinion gear, and a second sun gear that meshes with the second pinion gear;
a ratio of the number of teeth between the ring gear and the carrier and a ratio of the number of teeth between the second sun gear and the first sun gear are different; and
the speed ratio of the first counter gear mechanism and the speed ratio of the second counter gear mechanism are different.

9. A vehicle drive device comprising:
a first driving force source;
a second driving force source;
a first output member drivingly connected to a first wheel;
a second output member drivingly connected to a second wheel; and
a power transmission device, wherein:
the first driving force source and the second driving force source are arranged on a first axis;
the first output member and the second output member are arranged on a second axis that is different from the first axis;
the power transmission device includes a first gear that rotates integrally with a rotating body of the first driving force source, a second gear that rotates integrally with a rotating body of the second driving force source, a first counter gear mechanism and a second counter gear mechanism arranged on a third axis that is different from the first axis and the second axis, and a planetary gear mechanism disposed on the second axis;

the first counter gear mechanism includes a third gear that meshes with the first gear, and a fourth gear that rotates integrally with the third gear;

the second counter gear mechanism includes a fifth gear that meshes with the second gear, and a sixth gear that rotates integrally with the fifth gear;

the planetary gear mechanism is configured to transmit rotation of the fourth gear and the sixth gear to the first output member and the second output member and is disposed so as to overlap with both the first counter gear mechanism and the second counter gear mechanism as seen in an axial direction along an axial direction;

the planetary gear mechanism includes a ring gear, a carrier that rotatably supports a first pinion gear and a second pinion gear that rotates integrally with the first pinion gear and meshes with the ring gear, a first sun gear that meshes with the first pinion gear, and a second sun gear that meshes with the second pinion gear; and when the number of teeth of the ring gear is Zr,
the number of teeth of the first pinion gear is Zp1,
the number of teeth of the second pinion gear is Zp2,
the number of teeth of the first sun gear is Zs1, and
the number of teeth of the second sun gear is Zs2,
$1/Zr = 1/Zs2 - 1/Zs1 \times Zp1/Zp2$ is satisfied.

10. A vehicle drive device comprising:
a first driving force source;
a second driving force source;
a first output member drivingly connected to a first wheel;
a second output member drivingly connected to a second wheel; and
a power transmission device, wherein:

the first driving force source and the second driving force source are arranged on a first axis;

the first output member and the second output member are arranged on a second axis that is different from the first axis;

the power transmission device includes a first gear that rotates integrally with a rotating body of the first driving force source, a second gear that rotates integrally with a rotating body of the second driving force source, a first counter gear mechanism and a second counter gear mechanism arranged on a third axis that is different from the first axis and the second axis, and a planetary gear mechanism disposed on the second axis;

the first counter gear mechanism includes a third gear that meshes with the first gear, and a fourth gear that rotates integrally with the third gear;

the second counter gear mechanism includes a fifth gear that meshes with the second gear, and a sixth gear that rotates integrally with the fifth gear;

the planetary gear mechanism is configured to transmit rotation of the fourth gear and the sixth gear to the first output member and the second output member and is disposed so as to overlap with both the first counter gear mechanism and the second counter gear mechanism as seen in an axial direction along an axial direction; and an oil pump is disposed on an opposite side of the fourth gear and the sixth gear from the planetary gear mechanism in the axial direction.

\* \* \* \* \*